J. E. SHEAFFER.
EGG AND CREAM BEATER.
APPLICATION FILED APR. 4, 1916.
1,227,327.
Patented May 22, 1917.
2 SHEETS—SHEET 2.
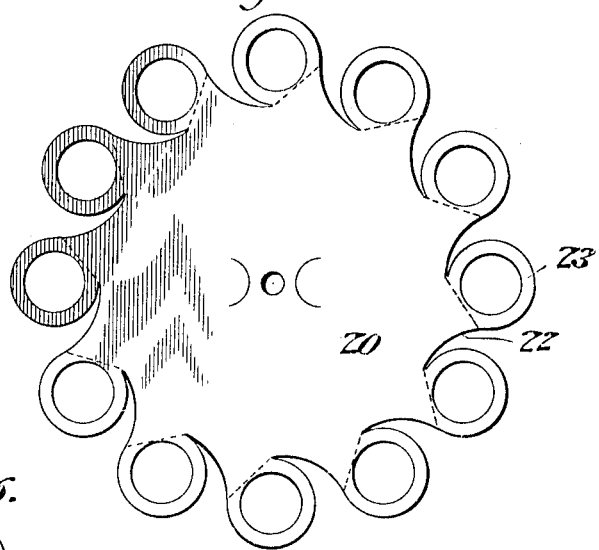
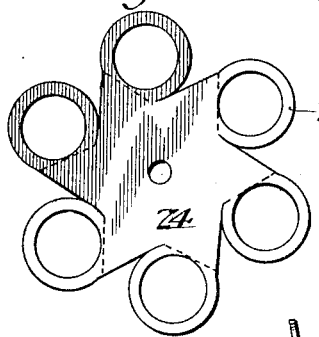
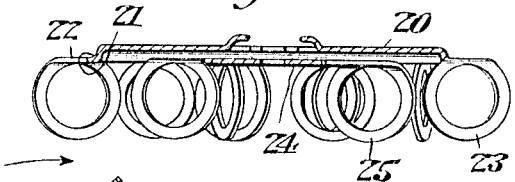
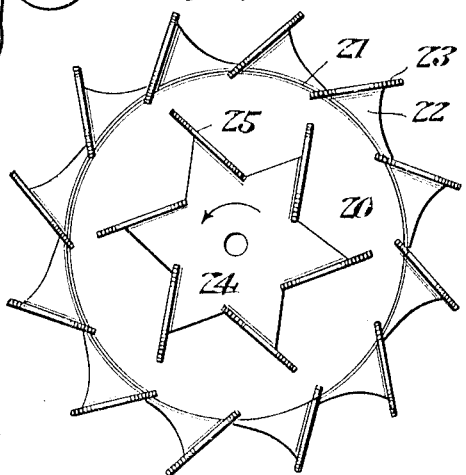
Inventor
John E. Sheaffer
Witness
M. H. Slifer
By Victor J. Evans
Attorney

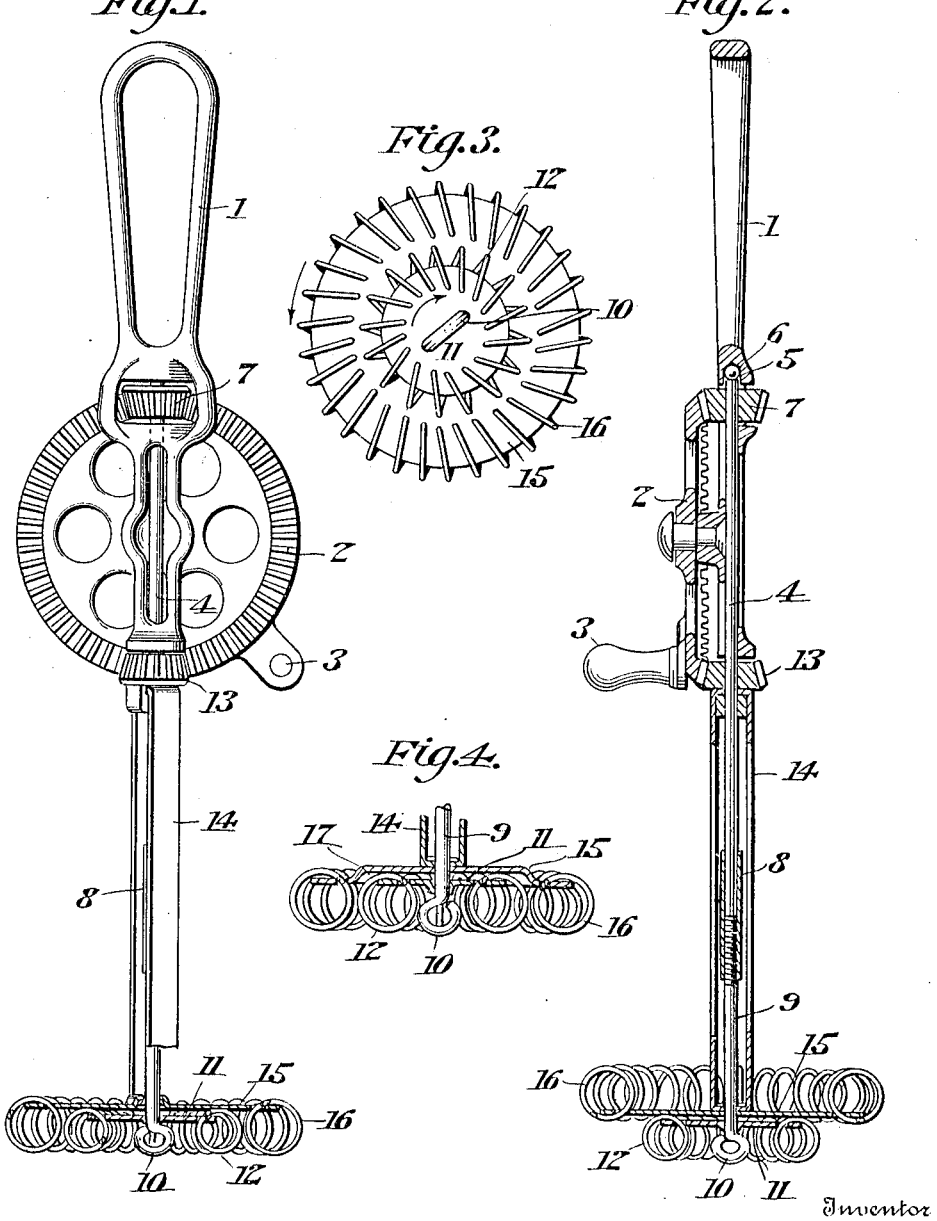

UNITED STATES PATENT OFFICE.

JOHN ELMER SHEAFFER, OF WASHINGTON, DISTRICT OF COLUMBIA.

EGG AND CREAM BEATER.

1,227,327.   Specification of Letters Patent.   Patented May 22, 1917.

Application filed April 4, 1916. Serial No. 88,914.

*To all whom it may concern:*

Be it known that I, JOHN ELMER SHEAFFER, a citizen of the United States, residing at Washington, in the District of Columbia, have invented new and useful Improvements in Egg and Cream Beaters, of which the following is a specification.

This invention relates to beaters adapted to be used for whipping eggs, cream and the like and it consists in the novel features hereinafter described and claimed.

An object of the invention is to provide a beater of the character indicated which includes in combination with a suitable support and means for turning the same, two disks concentrically arranged and each having at its peripheral portion agitators so arranged that the beater may be conveniently used for operating upon material which rests upon a flat surface or upon material which is contained within a concaved bowl or the like.

With this object in view the beater comprises a handle having a shaft journaled therein. A wheel is journaled upon the handle and meshes with a wheel carried by the shaft. A second wheel is journaled upon the handle and meshes with the first-mentioned wheel journaled upon the handle. Arms are carried by the last mentioned wheel and a disk is attached to the said arms. The first mentioned shaft is composed of separable sections, the lower one of which carries a disk which is positioned below the first mentioned disk. Agitators are carried at the peripheries of the disks and are adapted to operate in the material during the process of beating the same.

In the accompanying drawings:—

Figure 1 is a side view of one form of the beater with parts broken away and parts in section.

Fig. 2 is a transverse sectional view of the same.

Fig. 3 is an end view of the same.

Fig. 4 is a transverse sectional view of the end portion of a modified form of the beater.

Fig. 5 is a top plan view of a modified form of disk which may be used upon the beater.

Fig. 6 is a similar view of another disk adapted to coöperate with the disk shown in Fig. 5.

Fig. 7 is a sectional view of the disks shown in Figs. 5 and 6.

Fig. 8 is an under plan view of said disks.

The beater comprises a handle 1 which is preferably formed from cast or pressed metal. A gear wheel 2 is journaled for rotation at the side of the handle 1 and is provided with a handle 3 of usual pattern. A shaft 4 is journaled for rotation in the handle 1 and the said handle 1 is provided with a recess 5 which receives the upper end of the shaft 4, there being an anti-friction ball 6 interposed between the upper end of the shaft 4 and the bottom of the said recess 5. A gear wheel 7 is fixed to the upper portion of the shaft 4 and meshes with the wheel 2 at the upper part thereof.

The shaft 4 is composed of two separable sections. The upper section of the said shaft is provided at its lower end with a sleeve 8 in which the lower section 9 of the shaft 4 is screwthreaded. The section 9 is provided at its lower end with an enlargement 10 and a disk 11 is fixed to the lower portion of the section 9 just above the enlargement 10 thereof. The convolutions of a coiled member or agitator 12 pass through the edge portion of the disk 11 and the outer sides of the convolutions of the said member 12 are disposed beyond the edge of the disk 11 while the inner sides of the convolutions of the said member are disposed within the edge of the disk 11.

A gear wheel 13 is journaled upon the shaft 4 just below the lower end of the handle 1 and meshes with the lower portion of the gear wheel 2. Arms 14 are fixed to the gear wheel 13 and extend down along the shaft 4 and the shaft section 9 and spaced from the same. A disk 15 is fixed to the lower ends of the arms 14 and its lower surface rests upon the top sides of the convolutions of the member 12. The convolutions of a coiled member or agitator 16 pass through the edge portions of the disk 15 and the said member 16 completely surrounds the said disk. The outer sides of the convolutions of the member 16 lie beyond the edge of the disk 15 and the inner sides of the convolutions of the said member 16 lie within the edge of the disk 15. The relative arrangement of the member 16 with respect to the disk 15 is such that the said member 16 may be disposed with its major portion below the said disk as shown in Fig. 1 or the major portion thereof disposed above the disk as shown in Fig. 2 of the drawing. When the member 16 is in its lowered position as shown in Fig. 1 the lower portions of the convolutions thereof lie in the same horizontal plane as that in which the lower portions of the convolutions of the member 12 lie. The lower extremity of the enlargement 10 lies just below the plane in which the lower portions of the convolutions of the member 12 lie.

In the arrangement of parts as shown in Figs. 1, 2 and 3 of the drawing, the disk 11 lies below the disk 15 and in a plane parallel thereto. In the form of arrangement as shown in Fig. 4 of the drawing, the disk 15 is provided at its central portion with a struckup recess 17 which receives the disk 11 whereby the said disk 11 lies in the same horizontal plane as that in which the edge portion of the disk 15 lies. In this form of the invention the convolutions of the members 12 and 16 may be of the same diameter. In the arrangement as shown in Figs. 1, 2 and 3, the convolutions of the member 12 are slightly less in diameter than the convolutions of the member 16. In both forms of the invention the intermediate portion of the disk 15 rests upon the top sides of the convolutions of the member 12 and thus the disk 15 is held in proper position upon the section 9 and through the arms 14 the gear wheel 13 is held in proper mesh with the teeth of the gear wheel 2.

When the beater is used in material which is supported upon a flat or plain surface the member 16 is swung down to the position shown in Figs. 1 and 4 of the drawing and then the enlargement 10 of the section 9 is placed upon the upper surface of the bottom of the vessel which contains the material. Thus it will be seen that the lower portions of the convolutions of the members 12 and 16 are held spaced just above the upper surface of the bottom of the vessel and operate at equal distances from the same. When the wheel 2 is rotated by using the handle 3 the shaft 4 is rotated in one direction by the wheel 7 which meshes with the wheel 2 while the arms 14 are rotated in an opposite direction by the wheel 13 which also meshes with the wheel 2. Thus the disks 11 and 15 are carried around in opposite directions and the coiled members carried by the said disks operate in the material and effectually whip and beat the same.

When the beater is used in material contained in a bowl or similar vessel having a concaved bottom the member 16 is disposed with its major portion above the disk 15 as shown in Fig. 2 of the drawing. In this instance the enlargement 10 is placed against the upper surface of the bottom of the vessel approximately at the lowest point thereof and consequently the lower portions of the convolutions of the members 12 and 16 will be held spaced from the concaved bottom of the vessel.

When it is desired to separate the disk 11 from the disk 15 for the purpose of cleaning the disks and the coiled members mounted thereon, this may be readily accomplished by using the enlargement 10 as a handle and unscrewing the section 9 from the sleeve 8. After the section 9 has been detached from the shaft and sleeve 8 the said section 9 may be withdrawn from the disk 15 and the said disk 15 and arms 14 together with the wheel 13 may be removed from the shaft 4 and the handle 1. Thus the parts are separated and may be thoroughly cleaned. After cleansing the parts may be assembled by reversing the operation just above described.

As shown in Figs. 5, 6, 7 and 8 of the drawing the beating elements are formed from sheet metal disks which in turn are provided at their peripheries with outwardly disposed portions carrying beating loops. As the upper and lower disks differ slightly in design and configuration a specific description will be given of each. The upper disk 20 is struck up at its central portion as at 21 and is provided at its periphery with outwardly disposed portions 22. The said portions 22 carry loops 23 which are bent down at right angles to the portions 22 and disposed in lines tangential to a circle described from the center of the disk 20. The lower disk 24 is substantially a star shaped member and its intermediate portion lies in the same plane. The said member 24 is provided at one side of its point with loops 25 which are disposed at right angles to the plane of the intermediate portion of the said disk 24 and the said loops 25 are tangentially disposed with relation to a circle described from the center of the said disk 24. When the disks 20 and 24 are assembled as shown in Fig. 8 of the drawing the adjacent loops upon the disks 20 and 24 are approximately transversely disposed with relation to each other and as the disks are rotated in the direction indicated by the arrows in the said figure the said loops pass each other substantially in transverse arrangement; consequently the loops 23 at the edge of the disk 20 engage the material and have a tendency to draw the same toward the center of the disks 20 and 24 and away from the edge of the platter or bowl in which the beater is operated. As the liquid or material is passed by the loops 23 toward the loops 25 the said loops 25 act upon the said material to continue its movement toward the centers of the disks 20 and 24 and the material which passes through the opening in one loop is acted upon by the edge portion of the next succeeding loop consequently the material is thoroughly agitated and beaten and therefore it is quickly reduced to a proper or desired consistency.

By reference to Fig. 7 of the drawing it will be observed that when the disks 20 and 24 are properly positioned with relation to each other the loops 23 and 25 are at the same level and consequently the active corresponding parts of the two different sets of loops operate upon the material in the same plane. This arrangement produces a degree of uniformity in the beating action of the loops whereby the material operated upon by the loops is uniformly whipped or beaten.

From the foregoing description taken in conjunction with the accompanying drawing, it will be seen that a beater of simple and durable structure is provided and that the same may be conveniently and easily used for efficiently beating or whipping eggs, cream or like liquid substances.

Having described the invention what is claimed is:—

1. A beater comprising a plurality of disks each having a series of agitators which are concentrically arranged, all of the corresponding active points of all of the agitators lying in the same plane.

2. A beater comprising upper and lower disks, agitators carried by the disks, the agitators of the lower disks bearing against the under surface of the upper disk.

3. A beater comprising a handle, a shaft journaled in the handle, arms turnably mounted with relation to the shaft and handle, means mounted upon the handle for turning the shaft and arms, disks of different diameters mounted upon the shaft and arms, said disks having their edge portions lying in the same plane and agitators carried at the peripheral portions of the disks.

4. A beater comprising a handle, a shaft journaled in the handle arms turnably mounted with relation to the handle, means mounted upon the handle for turning the shaft and arms, disks carried by the arms and shaft, coil members carried at the peripheral portions of the disks, the convolutions of the coil members carried by the disks which is mounted upon the shaft bearing against the underside of the disk which is carried by the arms.

In testimony whereof I affix my signature.

JOHN ELMER SHEAFFER.

Copies of this patent may be obtained for five cents each, by addressing the "Commissioner of Patents, Washington, D. C."